US010928033B2

(12) United States Patent
Belliveau (10) Patent No.: US 10,928,033 B2
(45) Date of Patent: *Feb. 23, 2021

(54) THEATRE LIGHT PROJECTOR INCORPORATING A PLURALITY OF LIGHT SOURCES AND IMPROVEMENTS TO BLENDING THE LIGHT OUTPUT

(71) Applicant: Richard S. Belliveau, Austin, TX (US)

(72) Inventor: Richard S. Belliveau, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/895,255

(22) Filed: Jun. 8, 2020

(65) Prior Publication Data
US 2020/0300441 A1    Sep. 24, 2020

Related U.S. Application Data

(63) Continuation of application No. 16/156,510, filed on Oct. 10, 2018, now Pat. No. 10,718,486, which is a
(Continued)

(51) Int. Cl.
| | | |
|---|---|---|
| *F21V 5/00* | (2018.01) | |
| *F21V 9/40* | (2018.01) | |
| *F21V 8/00* | (2006.01) | |
| *G02B 5/02* | (2006.01) | |
| *F21Y 115/10* | (2016.01) | |

(Continued)

(52) U.S. Cl.
CPC ............. *F21V 5/007* (2013.01); *F21V 9/40* (2018.02); *G02B 5/02* (2013.01); *G02B 5/021* (2013.01); *G02B 5/0205* (2013.01); *G02B 5/0273* (2013.01); *G02B 6/0008* (2013.01);
(Continued)

(58) Field of Classification Search
CPC . F21W 2131/406; F21S 10/007; F21V 5/007; F21V 3/061; F21V 3/0615; F21V 3/062; F21V 3/0625; F21V 5/046; F21V 11/00; F21V 11/08; F21V 13/00; F21V 13/02; F21V 14/08; G02B 5/02; G02B 5/0205; G02B 5/0236; G02B 5/0242; G02B 5/0247; G02B 5/0252; G02B 5/0257;
(Continued)

(56) References Cited

U.S. PATENT DOCUMENTS

| | | |
|---|---|---|
| 4,392,187 A | 7/1983 | Bornhorst |
| 5,642,229 A | 6/1997 | Kaneko et al. |

(Continued)

OTHER PUBLICATIONS http://www.highend.com/products/led/solawash; May 6, 2017.
https://www.etcconnect.com/WorkArea/DownloadAsset.aspx?id= 10737484145; May 6, 2017.

*Primary Examiner* — Suezu Ellis
(74) *Attorney, Agent, or Firm* — Walter J. Tencza, Jr.

(57) ABSTRACT

A theatre light projector including a housing, a plurality of light sources, a first aperture device and a lens system. The lens system may include a first lens sector and a second lens sector, each of which may have a positive spherical optical power. The first lens sector may have a first radii, and the second lens sector may have a second radii, wherein the first radii and the second radii are substantially parallel to each other. The first aperture device may be comprised of a first aperture comprised of a color filter and/or a pattern. The plurality of light sources may be comprised of a first light source and a second light source and each may be comprised of a white solid state light source, which may be a light emitting diode. The white solid state light source may be a laser diode.

16 Claims, 10 Drawing Sheets

Related U.S. Application Data continuation-in-part of application No. 15/694,771, filed on Sep. 2, 2017, now Pat. No. 10,344,944, which is a continuation-in-part of application No. 15/588,604, filed on May 6, 2017.

(51) Int. Cl.
  *F21W 131/406* (2006.01)
  *F21V 29/83* (2015.01)
  *F21Y 113/13* (2016.01)

(52) U.S. Cl.
  CPC ........ *F21V 29/83* (2015.01); *F21W 2131/406* (2013.01); *F21Y 2113/13* (2016.08); *F21Y 2115/10* (2016.08)

(58) Field of Classification Search
  CPC .. G02B 5/0263; G02B 5/0273; G02B 5/0278; G02B 5/0294; G02B 26/008; G02B 7/006
  USPC .......... 362/249.1, 249.16, 427, 538
  See application file for complete search history.

(56) References Cited

U.S. PATENT DOCUMENTS

| | | |
|---|---|---|
| 5,752,766 A | 5/1998 | Bailey et al. |
| 5,882,107 A | 3/1999 | Bornhorst et al. |
| 5,988,835 A | 11/1999 | Allen |
| 6,048,080 A | 4/2000 | Belliveau |
| 6,474,837 B1 | 11/2002 | Belliveau |
| 7,048,383 B2 | 5/2006 | Belliveau |
| RE40,015 E | 1/2008 | Belliveau |
| RE41,726 E | 9/2010 | Belliveau |
| 7,887,219 B2 | 2/2011 | Belliveau et al. |
| 8,310,751 B2 | 11/2012 | Hough et al. |
| 8,518,495 B1 | 8/2013 | Ramotowski |
| RE44,903 E | 5/2014 | Belliveau |
| 8,770,764 B2 | 7/2014 | Belliveau et al. |
| 9,291,747 B2 | 3/2016 | Fournand et al. |
| 2009/0034260 A1 | 2/2009 | Ziemkowski |
| 2009/0237924 A1 | 9/2009 | Ladewig |
| 2014/0185285 A1 | 7/2014 | Jorgensen |
| 2014/0232992 A1 | 8/2014 | Egawa |
| 2015/0344725 A1 | 12/2015 | Selman |
| 2016/0173837 A1 | 6/2016 | Miyata |
| 2017/0205051 A1 | 7/2017 | Jorgensen |

THEATRE LIGHT PROJECTOR INCORPORATING A PLURALITY OF LIGHT SOURCES AND IMPROVEMENTS TO BLENDING THE LIGHT OUTPUT

CROSS REFERENCE TO RELATED APPLICATION(S)

The present application is a continuation of and claims the priority of U.S. patent application Ser. No. 16/156,510 titled "THEATRE LIGHT PROJECTOR INCORPORATING A PLURALITY OF LIGHT SOURCES AND IMPROVEMENTS TO BLENDING THE LIGHT OUTPUT", filed on Oct. 10, 2018 which is a continuation in part of and claims the priority of U.S. patent application Ser. No. 15/694,771, titled "THEATRE LIGHT PROJECTOR INCORPORATING A PLURALITY OF LIGHT SOURCES AND IMPROVEMENTS TO BLENDING THE LIGHT OUTPUT", filed on Sep. 2, 2017 which is a continuation in part of and claims the priority of U.S. patent application Ser. No. 15/588,604, titled "THEATRE LIGHT PROJECTOR INCORPORATING A PLURALITY OF LIGHT SOURCES AND IMPROVEMENTS TO BLENDING THE LIGHT OUTPUT", filed on May 6, 2017; and the present application claims the priority of all of Ser. Nos. 16/156,510; 15/694,771; and Ser. No. 15/588,604.

FIELD OF THE INVENTION

This invention relates to improved light projectors.

BACKGROUND OF THE INVENTION

Theatre light projectors are often used to light theatrical stages or entertainers. Known light projectors can be comprised of a plurality of light sources where the plurality of light sources are comprised of a plurality of light emitting diodes (LEDs) as described in my U.S. Pat. RE44,903. Known light projectors that are comprised of a plurality of light sources typically may have an output lens assigned to each light source that are not seamlessly integrated so that they look more like one central light source. The lack of an apparent seamless integration of the output lenses of the known light projectors can be referred to in the theatrical industry as a "fly eye" type of light projector.

For example the SolaWash (trademarked) nineteen LED light projector as sold by High End Systems (trademarked) of Austin, Tex., as shown at http://www.highend.com/products/led/solawash is comprised of circular arrays of discrete lenses that are not seamlessly integrated. A further example of a known light projector with a plurality of light sources and lenses is the ColorSource(trademarked) Par as marketed by Electronic Theatre Controls of Middleton, Wis. and is found at https://www.etcconnect.com/WorkArea/DownloadAsset.aspx?id=10737484145

It is desirable to better integrate a plurality output lenses used by a light projector so that the light projector appears to an audience as an apparent single light source.

SUMMARY OF THE INVENTION

An improved theatre light projector having multiparameter attributes is disclosed. The light projector may include a plurality of light sources, a lens system comprised of a plurality of sectors, and a housing having an inner chamber. The lens system may have a first side and a second side. The plurality of light sources and the lens system operate to produce an improved blended light beam for the light projector with less undesirable artifacts than previously known.

In at least one embodiment, a theatre light projector is provided which includes a housing, a plurality of light sources, a first aperture device and a lens system. The lens system may be comprised of a first lens sector and a second lens sector. Each of the first lens sector and the second lens sector may have a positive spherical optical power. In at least one embodiment, the first lens sector has a first radii, and the second lens sector has a second radii, wherein the first radii and the second radii are substantially parallel to each other.

The first aperture device may be comprised of a first aperture and the first aperture may be comprised of a color filter. The first aperture device may be comprised of a first aperture device and the first aperture device may be comprised of a pattern. The plurality of light sources may be comprised of a first light source and a second light source and each of the first light source and the second light source may be comprised of a white solid state light source. The white solid state light source may be a light emitting diode. The white solid state light source may be a laser diode.

The plurality of light sources may include a first light source and a second light source; wherein the first light source has a first heat sink and the second light source has a second heat sink; wherein the first light source is configured to project a first light having a first light path having a direction; and wherein the first heat sink is comprised of an adjustment mechanism for altering the direction of the first light path. The heat sink adjustment mechanism may be comprised of a compression component.

The theatre light projector may further include an output aperture wherein at least one surface of the output aperture has a stable wetting coating. The stable wetting coating may be a silicone derivative nano coating.

In at least one embodiment a theatre light projector is provided comprising a housing, a plurality of light sources, a first aperture device and variable diffusion system; wherein the plurality of light sources is comprised of a first light source which is configured to project a first light in a first light path and further comprising a second light source which is configured to project a second light in a second light path.

The variable diffusion system may be comprised of a first diffusing substrate and a second diffusing substrate. The first diffusing substrate may be rotatable into a first state and a second state wherein in the first state the first diffusing substrate is substantially perpendicular to the first light path and wherein in the second state the first diffusing substrate is substantially parallel to the first light path; and wherein the second diffusing substrate is rotatable into a first state and a second state wherein in the first state the second diffusing substrate is substantially perpendicular to the first light path and wherein in the second state the second diffusing substrate is substantially parallel to the second light path.

In at least one embodiment, the first aperture device is comprised of a first aperture and the first aperture is comprised of a color filter. The first aperture device may be comprised of a first aperture device and the first aperture device may be comprised of a pattern.

In at least one embodiment, the plurality of light sources are comprised of a first light source and a second light source and each of the first light source and the second light source is a white light source. Each of the plurality of light sources may be a light emitting diode.

The theatre light projector may include an output aperture wherein at least one surface of the output aperture has a stable wetting coating. The stable wetting coating may be a silicone derivative nano coating.

The plurality of light sources may be comprised of a first light source and a second light source wherein the first light source has a first heat sink and the second light source has a second heat sink; wherein the first light source is configured to project a first light in a first light path; and wherein the first heat sink is comprised of an adjustment mechanism for altering a direction of the first light path. The heat sink adjustment mechanism may be comprised of a compression component.

In at least one embodiment, a theatre light projector is provided comprising a housing, a plurality of light sources, a first aperture device, a lens system and a output aperture. The plurality of light sources may be comprised of a first light source and a second light source.

The first light source may be a solid state white light source, and the second light source may be a second solid state white light source. The first aperture device may be comprised of a plurality of apertures, including a first aperture, a second aperture, and an output aperture; wherein the first aperture is comprised of a first color filter; wherein the second aperture is comprised of a second color filter; wherein the output aperture is comprised of a first surface and a second surface; and wherein at least the first surface has a stable wetting coating. The stable wetting coating may be a silicon derivative nano coating.

The lens system may be comprised of a plurality of pie shaped lens components. The diffusing system may be comprised of a plurality of rotatable diffusing substrates.

In at least one embodiment, a theatre light projector is provided comprising a housing, a plurality of light sources, a plurality of lenses, a light exiting output aperture, and a central integrating mask. The light exiting output aperture may have a center; the plurality of light sources may be arranged around a central axis; the plurality of light sources may project light though the light exiting output aperture; the center of the of the light exiting output aperture may be substantially void of projected light projected by the plurality of light sources; and the central integrating mask may be located in the center of the light exiting aperture and partially intersects a portion of the projected light from each of the plurality of light sources.

In at least one embodiment, the theatre light projector may further include a diffusion system, wherein the diffuser system is comprised of a plurality of segments; and wherein the diffusion system is located between the plurality of light sources and the light exiting output aperture and intersects the projected light from the plurality of light sources.

The theatre light projector may further include an aperture device comprising a first color filter and a second color filter; and wherein the aperture device is located between the plurality of light sources and the light exiting output aperture and intersects the projected light from the plurality of light sources.

The theatre light projector may further include a means for traversing the plurality of lenses; and wherein the plurality of lenses and the means for traversing the plurality of lenses are located between the plurality of light sources and the light exiting output aperture and intersect the projected light from the plurality of light sources.

The plurality of light sources may be comprised of a first light emitting diode light source projecting light out in a first light path and a second light emitting diode light source projecting light out in a second light path; wherein the first light emitting diode light source has a first heat sink and the second light emitting diodes light source has a second heatsink and the first heat sink is adjustable to alter a the first light path and the second heatsink is adjustable to alter a direction the second light path.

In at least one embodiment a theatre light projector is provided which may include a housing, a plurality of light sources, a plurality of lenses, and a diffusion system; wherein the plurality of light sources are arranged around a central axis; wherein each of the plurality of light sources project light though the diffusion system; wherein the diffusion system has a center; and wherein the center of the diffusion system is substantially void of light projected by each of the plurality of light sources; and wherein the central integrating mask is located in the center of the diffusion system and partially intersects a portion of the light projected by each of the plurality of light sources.

The theatre light projector may further include a light exiting aperture which is comprised of glass; and wherein the light exiting aperture intersects at least a portion of the light projected by each of the plurality of light sources.

The theatre light projector may further include a light exiting aperture which is comprised of a polymer; and wherein the light exiting aperture intersects at least a portion of the light projected by each of the plurality of light sources.

The theatre light projector may further include an aperture device comprising a first and second color filter; and wherein the aperture device intersects at least a portion of the light projected by each of the plurality of light sources.

The theatre light projector may further include a means for traversing the plurality of lenses; and wherein the plurality of lenses and the means for traversing the plurality of lenses are located between the plurality of light sources and a light exiting output aperture and intersect the projected light from the plurality of light sources.

The plurality of light sources may be comprised of a first light emitting diode light source projecting light out in a first light path and a second light emitting diode light source projecting light out in a second light path; wherein the first light emitting diode light source has a first heat sink and the second light emitting diode light source has a second heat sink and the first heat sink is adjustable to alter the first light path and the second heat sink is adjustable to alter the second light path.

DETAILED DESCRIPTION OF THE DRAWINGS

Figure 1:
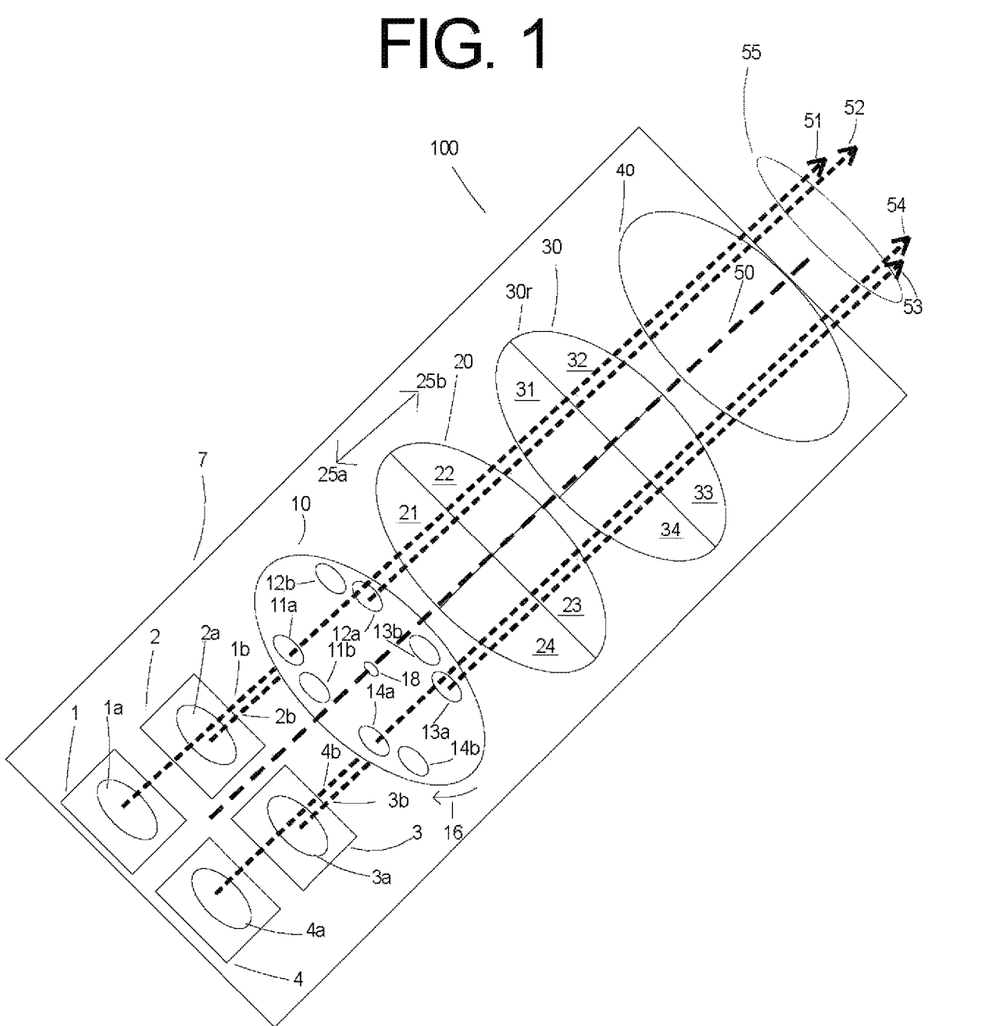
FIG. 1 shows a simplified diagram of light projector in accordance with an embodiment of the present invention.

FIG. 1 shows a simplified diagram of light projector 100 in accordance with an embodiment of the present invention. The light projector 100 has an external housing 7. The light projector 100 is comprised of a plurality of light sources 1a, 2a, 3a and 4a. Each of the light sources 1a, 2a, 3a and 4a may be comprised of a solid state light source such as a light emitting diode (LED) or a laser diode (LD). LED 1a is mounted to a heatsink 1, LED 2a is mounted to a heatsink 2, LED 3a is mounted to a heatsink 3 and LED 4a is mounted to a heatsink 4. Heatsinks 1, 2, 3 and 4 may be aluminum or copper heatsinks and may also be comprised of fluid pipes as known in the art to remove heat from the LEDs 1a, 2a, 3a, and 4a.

LEDs (or solid state light source) 1a, 2a, 3a, and 4a may be of any wavelength (color) including white full spectrum but preferably each of LEDs 1a, 2a, 3a and 4a is comprised of multiple dies, each die having a different wavelength and may include white full spectrum, so that each of LEDs 1a, 2a, 3a, and 4a is comprised of multiple wavelengths and may include white full spectrum.

Dotted line 1b shows a light path of a projected light from LED 1a. Dotted line 2b shows a light path of a projected light from LED 2a. Dotted line 3b shows a light path of a projected light from the LED 3a and dotted line 4b shows a light path of a projected light from the LED 4a.

An aperature device 10 of the light projector 100 of FIG. 1 is positioned to intersect the light paths 1b, 2b, 3b, and 4b, simultaneously as described in U.S. Pat. RE40,015 to Belliveau, which is incorporated by reference herein. As the aperture device 10 is rotated different apertures can intersect the light paths 1b, 2b, 3b and 4b. FIG. 1 shows light path 1b passes though aperture 11a, light path 2b passes though aperture 12a, light path 3b passes though aperture 13a and light path 4b passes though aperture 14a. When the aperture device 10 is rotated (with any suitable means as known in the art) in the direction of arrow 16 light path 1b passes though aperture 11b, light path 2b passes though aperture 12b, light path 3b passes though aperture 13b and light path 4b passes though aperture 14b. The apertures 11a, 12a, 13a, 14a, 11b, 12b, 13b and 14b may be through hole apertures or contain color filters to modify the final output wave lengths (or color) of the LEDs 1a, 2a, 3a and 4a. Apertures 11a, 12a, 13a, 14a, 11b, 12b, 13b and 14b may contain patterns to project images similar to gobo wheels with multiple pattern apertures as known in the art, and as disclosed, for example, in U.S. Pat. No. 5,402,326 to Belliveau, which is incorporated by reference herein.

The aperture device 10 shown contains eight apertures for simplification. However more apertures can be provided. The apertures that contain patterns may have all the same patterns at the same time for light paths 1b, 2b, 3b and 4b or the apertures may have different patterns for each of the light paths 1b, 2b, 3b and 4b. The light projector 100 of FIG. 1 is comprised of one aperture device 10, however multiple aperture devices can be provided. The aperture device 10 may also be comprised of four separate pattern wheels with one separate pattern wheel for each light path 1b, 2b, 3b, and 4b. FIG. 1 shows a dashed line 50 that is the center axis of the light projector 100 for reference. The center 18 of filter of aperture device 10 is also shown in line with the center axis dashed line 50 for symmetry.

Figure 3:
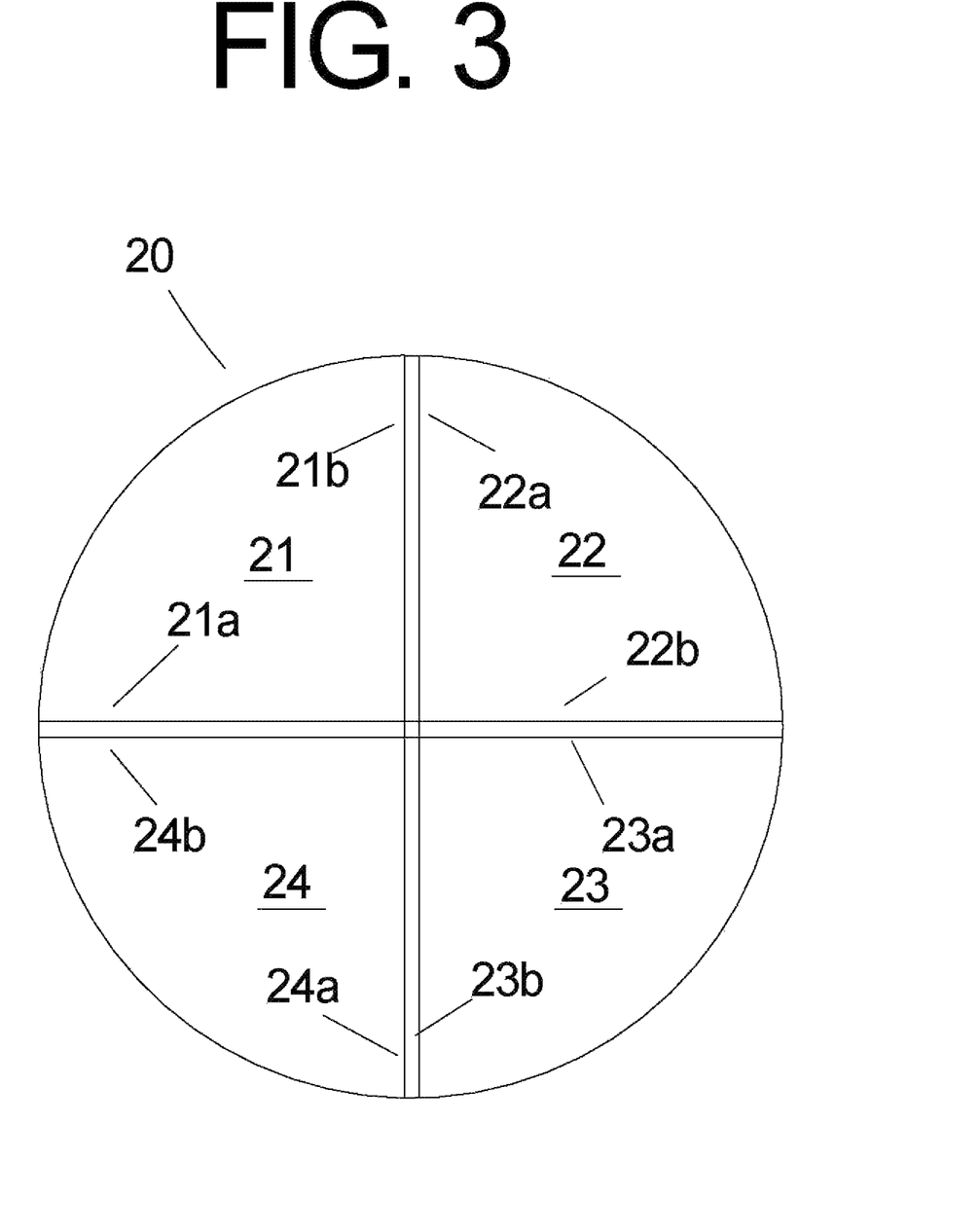
FIG. 3 shows a frontal view of a lens system comprised of a plurality of segments for use with the light projector of FIG. 1.

The light projector 100 of FIG. 1 is comprised of a lens system 20. The lens system 20 is comprised of four lens sectors 21, 22, 23 and 24. Light path 1b passes though lens sector 21, light path 2b passes though lens sector 22, light path 3b passes though lens sector 23 and light path 4b passed though lens sector 24. Each of lens sectors 21, 22, 23 and 24 has an optical power that is a positive spherical optical power created by a radial curvature. It is important to keep the spherical optical power of the lens sectors 21, 22, 23, and 24 as this allows for imaging and focusing of projection patterns provided by the filter or pattern wheel 10 of FIG. 1. For clarity on the term sector, a sector by definition, in accordance with the present application, is substantially a shape that is enclosed between an arc and two radii at either end of the arc and sometimes referred to as a substantially pie shaped section or triangular section. A pie shaped section should have at least two substantially flat sides in order to create the improved blended light beam output The lens system 20 can be constructed of a polymer or glass and the sectors 21, 22, 23, and 24 can be molded or ground and polished. The lens sectors 21, 22, 23 and 24 can alternatively be constructed of a polymer Fresnel lens material to lower weight. The lens system 20 can be constructed of four separate lens sectors 21, 22, 23 and 24 and then fixed together by any suitable means or the lens system 20 can be constructed or molded of one piece. It is preferable for the lens sectors 21, 22, 23, and 24 to have their radii as close together as possible to create a seamlessly integrated output beam of light that does not have the "fly eye" look when an operator views the light output. FIG. 1 shows the integrated output projected light 55 of the light projector 100 with the output projected light projecting in the direction of arrow 51 for light path 1b, arrow 52 for light path 2b, arrow 53 for light path 3b and arrow 54 for light path 4b. FIG. 3 for reference shows a frontal view of the lens system 20 along with lens sector 21 with associated radii 21a and 21b, lens sector 22 with associated radii 22a and 22b, lens sector 23 with associated radii 23a and 23b and lens sector 24 with associated radii 24a and 24b.

FIG. 3 shows that lens sector 21 has radii 21b substantially parallel to radii 22a of sector 22. Lens sector 22 has radii 22b substantially parallel to radii 23a of lens sector 23. Lens sector 23 has radii 23b substantially parallel to radii 24a of lens sector 24. Lens sector 24 has radii 24b substantially parallel to radii 21a of lens sector 21.

The lens system 20 of FIG. 1 can also traverse along the center axis 50 in the direction of arrows 25a and 25b by any suitable means as known in the art to obtain a variable focus in relation to the filter and/or pattern wheel 10.

FIG. 1 shows a diffusion system 30 that includes four optically diffusing sectors 31, 32, 33 and 34. Light path 1b passes though the diffusing sector 31, light path 2b passes though the diffusing sector 32, light path 3b passed though the diffusing sector 33, and light path 4b passes though the diffusing sector 34.

Figure 4:
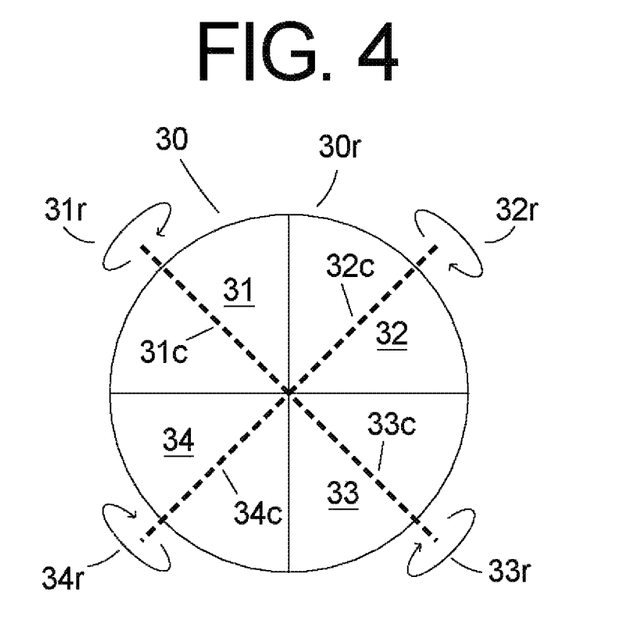
FIG. 4 shows a frontal view of a diffusion system comprised of a plurality of segments for use with the light projector of FIG. 1, in a first diffusing state.

FIG. 4 shows a front view of the diffusion system 30 in a first state 30r. In the state 30r the diffusing sectors 31, 32, 33 and 34 intersect light paths 1b, 2b, 3b and 4b perpendicularly, respectively. In the state of 30r the light paths 1b, 2b, 3b and 4b pass though the optical diffusion substrate of the diffusing sectors. The diffusing sectors 31, 32, 33 and 34 may be manufactured of ground glass or an optically diffusing polymer substrate material such as manufactured by Bright View Technologies (trademarked) of Durham N.C. Each of the diffusing sectors 31, 32, 33 and 34 may be rotated along a center axis. For FIG. 4 diffusing sector 31 is rotatable about axis 31c in the direction of arrow 31r, which is in a plane perpendicular to the plane shown in FIG. 4. The diffusing sector 32 is rotatable about axis 32c in the direction of arrow 32r, which is in a plane perpendicular to the plane shown in FIG. 4 The diffusing sector 33 is rotatable about axis 33c in the direction of arrow 33r, which is in a plane perpendicular to the plane shown in FIG. 4. The diffusing sector 34 is rotatable about axis 34c in the direction of arrow 34r, which is in a plane perpendicular to the plane shown in FIG. 4.

Figure 5:
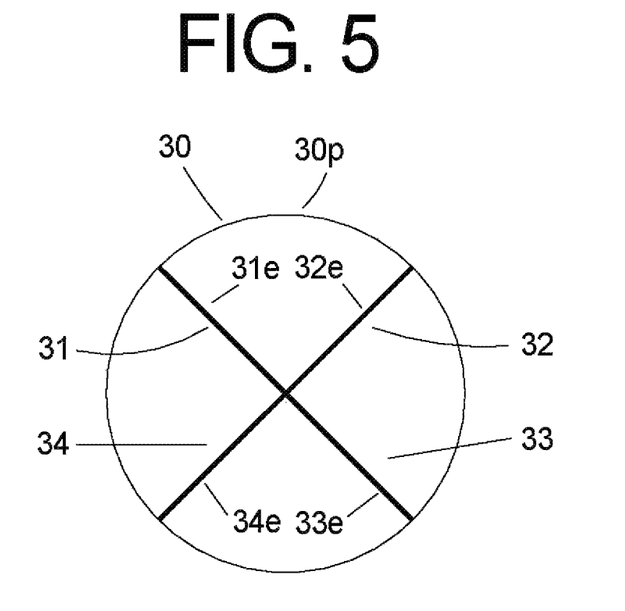
FIG. 5 shows a frontal view of the diffusion system of FIG. 4 comprised of a plurality of segments in a second non-diffusing state.

FIG. 5 shows the diffusion system 30 in a second state 30p. In the stage 30p each of the four optically diffusing sectors 31, 32, 33 and 34 has been rotated about their center axis ninety degrees so that the edges of the diffusing sector substrates, and the planes of the diffusing sectors 31, 32, 33, and 34, are arranged parallel to the light paths 1b, 2b, 3b, and 4b. FIG. 5 shows the edge 31e of the substrate of the optically diffusing sector 31, the edge 32e of the substrate of the optically diffusing sector 32, the edge 33e of the substrate of the optically diffusing sector 33 and the edge 34e of the substrate of the optically diffusing sector 34. The diffusion system 30 of FIG. 5 in state 30p allows the light paths 1b, 2b, 3b, and 4b to effectively pass through the diffusion system 30 without substantially altering the light paths 1b, 2b, 3b or 4b with the diffusion optical property of the diffusing sectors 31, 32, 33 and 34. The diffusing sectors 31, 32, 33, and 34 can be rotated about their corresponding axes 31c, 32c, 33c and 34c, respectively, by any suitable electro mechanical or manual means as known in the art.

The light projector 100 of FIG. 1 shows an exiting aperture 40 that may be constructed of a clear glass or a polymer. U.S. Pat. No. 8,770,764 to Belliveau, incorporated by reference herein, describes a system for reducing theatrical air born haze for a light projector that accumulates on output lenses or exiting apertures. The theatrical air born haze is comprised of glycol or mineral oil fog particles that are commonly created by atomization of the liquid glycol or mineral oil by theatrical fog generating devices (fog machines). The glycol or mineral oil particles (referred to herein as theatrical fog particles) can each range in size from between twenty microns to below 0.1 micron.

Because there can be a temperature differential between the inner surface and the outer surface of the exiting aperture 40 theatrical haze can typically form condensate on the inner surface or outer surface of the output optics. When the theatrical fog condensation forms on the optics the output light can become defused by the light scattering properties of the theatrical haze condensate. U.S. Pat. No. 8,770,764, incorporated by reference, has been reduced to practice and works well, however the light projector 100 of FIG. 1 can always benefit from a cost reduction. The defogging system as described in U.S. Pat. No. 8,770,764 is comprised of several components including electronic power supplies, wiring and power resistors on a circuit board that accumulate to an increased cost of the light projector 100 if the system described by U.S. Pat. No. 8,770,764 were to be employed.

Figure 6:
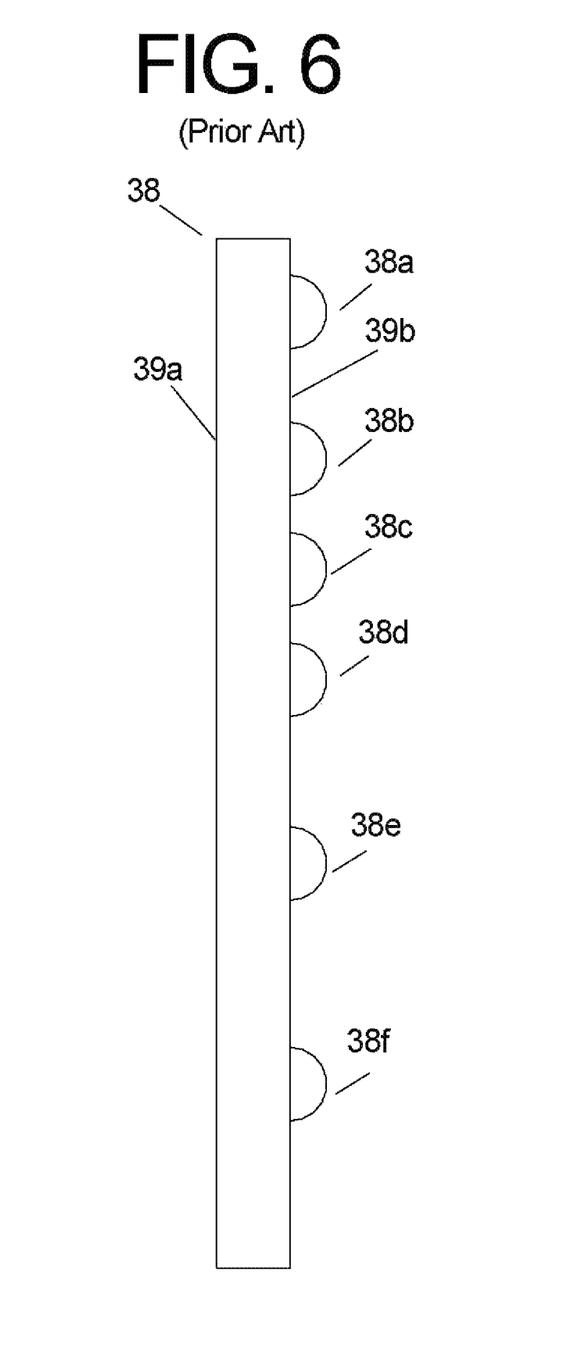
FIG. 6 shows a side view of an output aperture of the prior art.

FIG. 6 shows a prior art output aperture 38 without the benefit of the system described by U.S. Pat. No. 8,770,764. In a known light projector the output aperture 38 can have a surface 39a located on a side near the internal housing of the known light projector and opposite surface side 39b near the outside of the known light projector. Because the side 39a is usually operating in a higher ambient temperature, the side 39b is operating in cooler ambient temperature. This causes the accumulation of fog particles like those shown as 38a, 38b, 38c, 38d, 38e, and 38f on the surface 39b. The theatrical fog particles 38a, 38b, 38c, 38d, 38e, and 38f are formed as raised droplets because the surface energy of the substrate that the output aperture 38 is comprised of is higher than that of the surface tension of the theatrical fog particle. The inventor has found that by increasing the surface energy of the surface 39b of the output aperture 38 can increase the wetting characteristics of the surface and therefore reduce the height of the raised theatrical fog droplets to reduce the unwanted scattering of light by the apparent haze. This is especially important when incorporating low energy apertures or lenses made from polymers like PMMA (polymethyl methacrylate) or polycarbonate.

Figure 7:
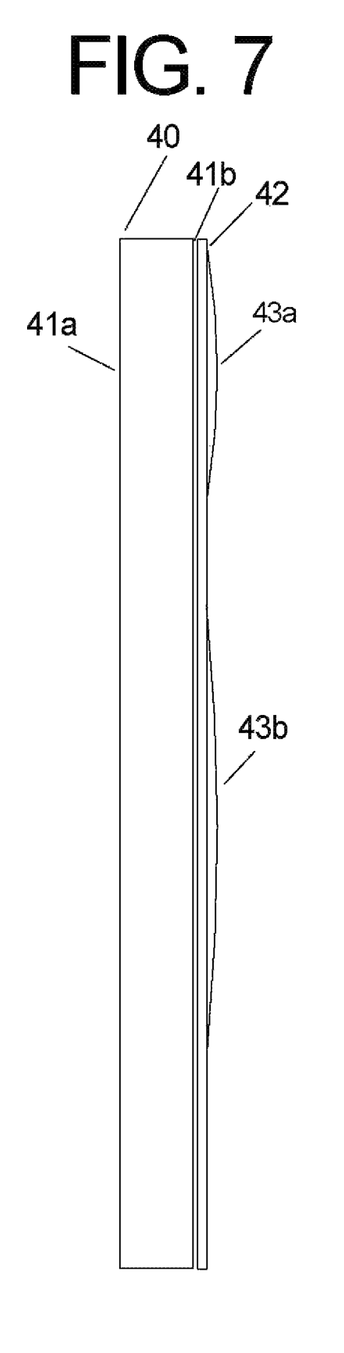
FIG. 7 shows a side view of an output aperture incorporating a stable wetting coating in accordance with an embodiment of the present invention.

FIG. 7 shows the output aperture 40 of the light projector 100 that may exhibit a positive or negative optical power. The output aperture 40 has a stable nano coating 42 applied to the surface 41b that increases the wetting characteristics of the light output aperture 40. A stable coating 42 is defined as a coating that increases the wetting characteristics of the aperture 40 even after during frequent wetting and dewetting cycles. The stable nano coating 42 is able to substantially withstand cleaning by industrial and household glass cleaners as the light projector 100 is often used in dirty and dusty outdoor shows and the apertures can be coated with dust and dirt that require cleaning.

The stable nano coating 42 can be comprised of silicon derivative such as silicone dioxide, silanes or siloxanes or a polymer in a solvent that can then be dip coated, sprayed or flow coated onto the output aperture 40 onto the surface 41b and/or the surface 41a of the aperture of FIG. 7 The stable nano coating 42 increases the surface energy of the surface 41b so that theatrical fog particles 43a and 43b easily wet the surface 41b in a sheeting out manner (the sheeting out is preferably substantially flat and the fog particles 43a and 43b are shown as an exaggerated curve for the case of observance in the drawing).

Figure 2A:
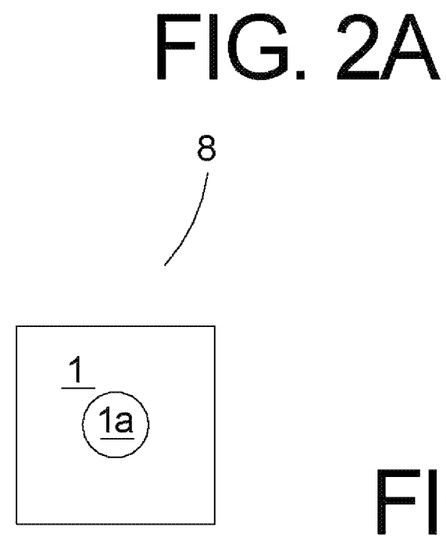
FIG. 2A shows a close up of a light emitting module for use with the light projector of FIG. 1.

FIG. 2A shows a frontal view of the heatsink 1 of FIG. 1 of light projector 100. Heatsink 1 is identical to or substantially the same as heatsinks 2, 3 and 4 of FIG. 1 of light projector 100. Heatsink 1 shows LED or light source 1a that may be the same type of LED or light source for LED 2a, 3a and 4a of FIG. 1 of light projector 100.

Figure 2B:
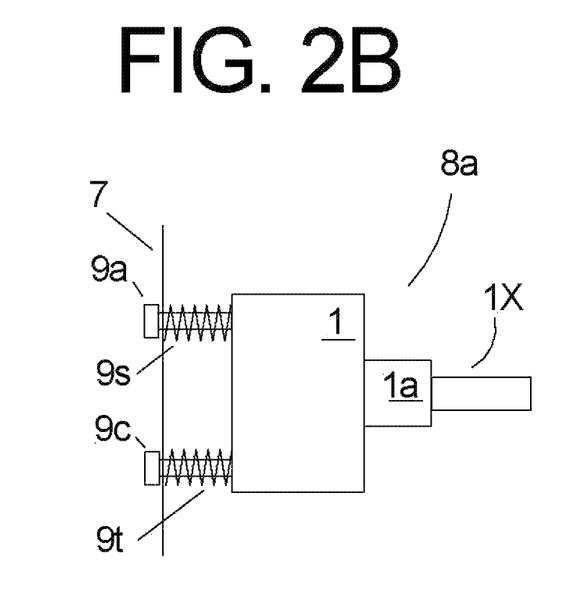
FIG. 2B shows a side view of the light emitting module of FIG. 2A, and an adjustment system.
Figure 2C:
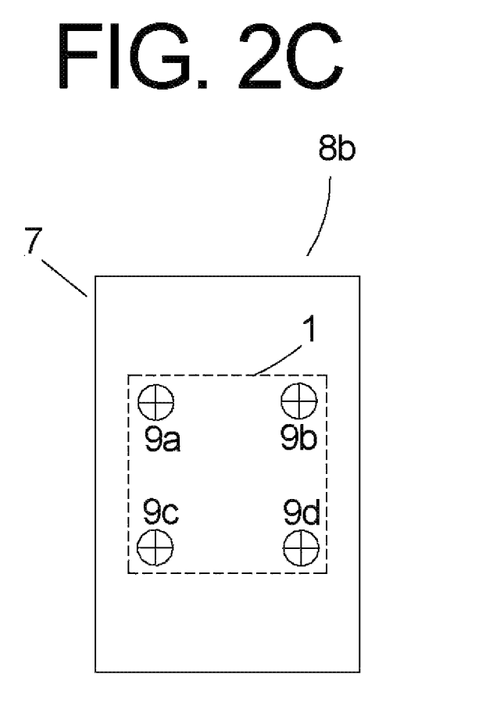
FIG. 2C shows a rear view of the light emitting module of FIG. 2A and the adjustment system of FIG. 2B.

FIG. 2B shows a side view of the heatsink 1 and LED or light source 1a. The LED or light source 1a has an optical light pipe 1x that may be fixed to the light source 1a in any manner. The optical light pipe 1x is used to gather and homogenize the light emitted by the LED or light source 1a. Each of LEDs or light sources 2a, 3a, and 4a may also include a similar or identical optical light pipe, like optical light pipe 1x. The heatsink 1 is fixed to a stable surface 7 such as the lamp housing 7 of FIG. 1. The heatsink 1 is fixed to the surface 7 by screw fasteners 9a and 9c. Springs 9s and 9t (or a flexible component such as an elastomer) are used to provide compression positioning adjustment of the heatsink 1 in relation to the surface 7 as the fasteners 9a and 9c are loosened or tightened. FIG. 2B shows a rear view of the heatsink 1 under the surface 7 by dotted line. Four screw fasteners are shown 9a, 9b (which are the same at 9a and 9b of FIG. 2A) and 9c and 9d. At least three of the fasteners of fasteners 9a, 9b, 9c, and 9d provide compression positioning of the heatsink 1 that results in fine the tuning of the direction of the light path 2 through the light projector 100 of FIG. 1. The heat sinks 1, 2, 3 and 4 of FIG. 1 are fitted with this fine tuning positioning of the direction of the light paths 1b, 2b, 3b and 4b respectively. The fine tuning of the direction of the light paths 1b, 2b, 3b and 4b allow a technician to obtain the correct alignment of the light paths 1b, 2b, 3b and 4b at the output integrated light 55 of light projector 100 for blended light beam output with less undesirable artifacts.

During the research on the project the inventor has realized that further improvements to the blending of the light output of the theatre light projector 100 of FIG. 1 can be realized. When the light paths 1b, 2b, and 3b and 4b pass through the final output components shown as output aperture 40 or diffusion system or apparatus 30 there is a light void area created along the center axis 50 of theatre light projector 100 where the light paths 1b, 2b, 3b and 4b do not converge that can be distracting and increases the undesirable perception of an unblended light output at the output integrated light 55 of light projector 100 shown in FIG. 1.

Figure 8:
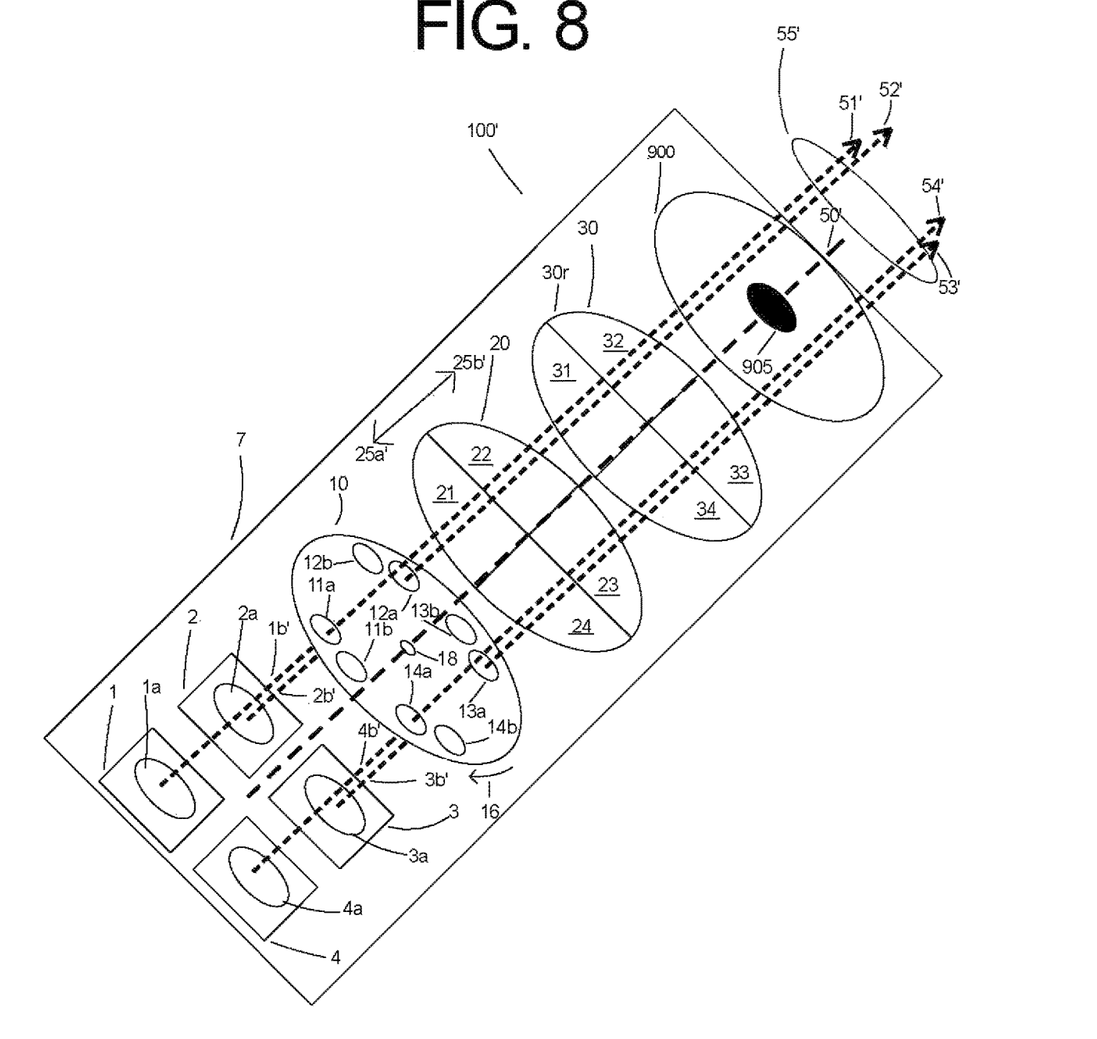
FIG. 8 shows a light projector in accordance with another embodiment of the present invention.

FIG. 8 shows a light projector 100' in accordance with another embodiment of the present invention. The light projector 100' is identical to the light projector 100 of FIG. 1, except as will be explained. The light projector 100' has an output aperture 900 which differs from the output aperture 40 of the light projector 100. The output aperture 900 includes a central integrating mask 905 which is used to mask a light void area, along a center axis 50' The light mask 905 is preferably black in color and can be created of preferably round metal sheet having a thickness of approximately one half to one millimeter. FIG. 8 shows light paths 1b', 2b', 3b', and 4b', and arrows 51', 52', 53', and 54', 25a' and 25b' which may differ somewhat from light paths 1b, 2b, 3b, 4b, and arrows 51, 52, 53, 54, and arrows 25a and 25b, respectively, due the presence of component 900 as opposed to component 40 in FIG. 1, and generally due to the fact that light projector 100' is a different overall device from light projector 100.

Figure 9:
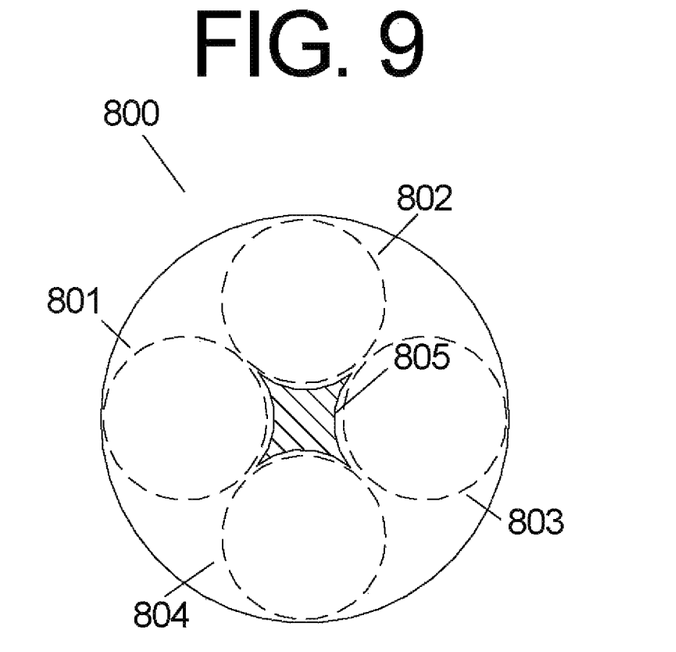
FIG. 9 shows a front view of a device, which can be used to form an output aperture of the light projector of FIG. 8.

FIG. 9 shows a front view of a device 800, which can be used to form the output aperture 900 of the light projector 100'. Four dotted circles 801, 802, 803 and 804 are shown that represent the predicted illuminated area of the light paths of 1b', 2b', 3b', and 4b' respectively predicted to pass through the device 800 (without a mask 905). A light void area 805 (when there is now mask 905) centered on the center axis 50' of light projector 100' is shown where the predicted light paths 1b', 2b', 3b' and 4b' as shown by circles 801, 802, 803, and 804 are not converged to illuminate the light void area 805.

Figure 10:
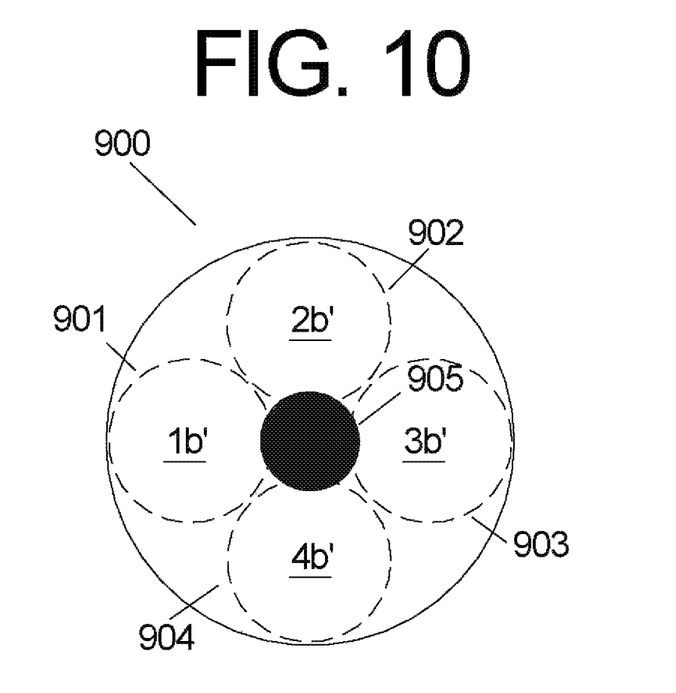
FIG. 10 shows a front view of the output aperture of the light projector of FIG. 8.

FIG. 10 shows a front view of the output aperture 900 of the light projector 100' with a central integrating mask 905 fixed to the device 800 of FIG. 9 to form an output aperture 900 in any way such as by glue or support bracket not shown. Four dotted circles 901, 902, 903 and 904, or approximate circles or regions, are shown that represent the illuminated area of the light paths of 1b', 2b', 3b', and 4b' respectively that pass through the output aperture 900. The light void area 805 of FIG. 9 centered on the center axis 50' of light projection 100' has been masked in the non-converged area by the central integrating mask 905.

Figure 11:
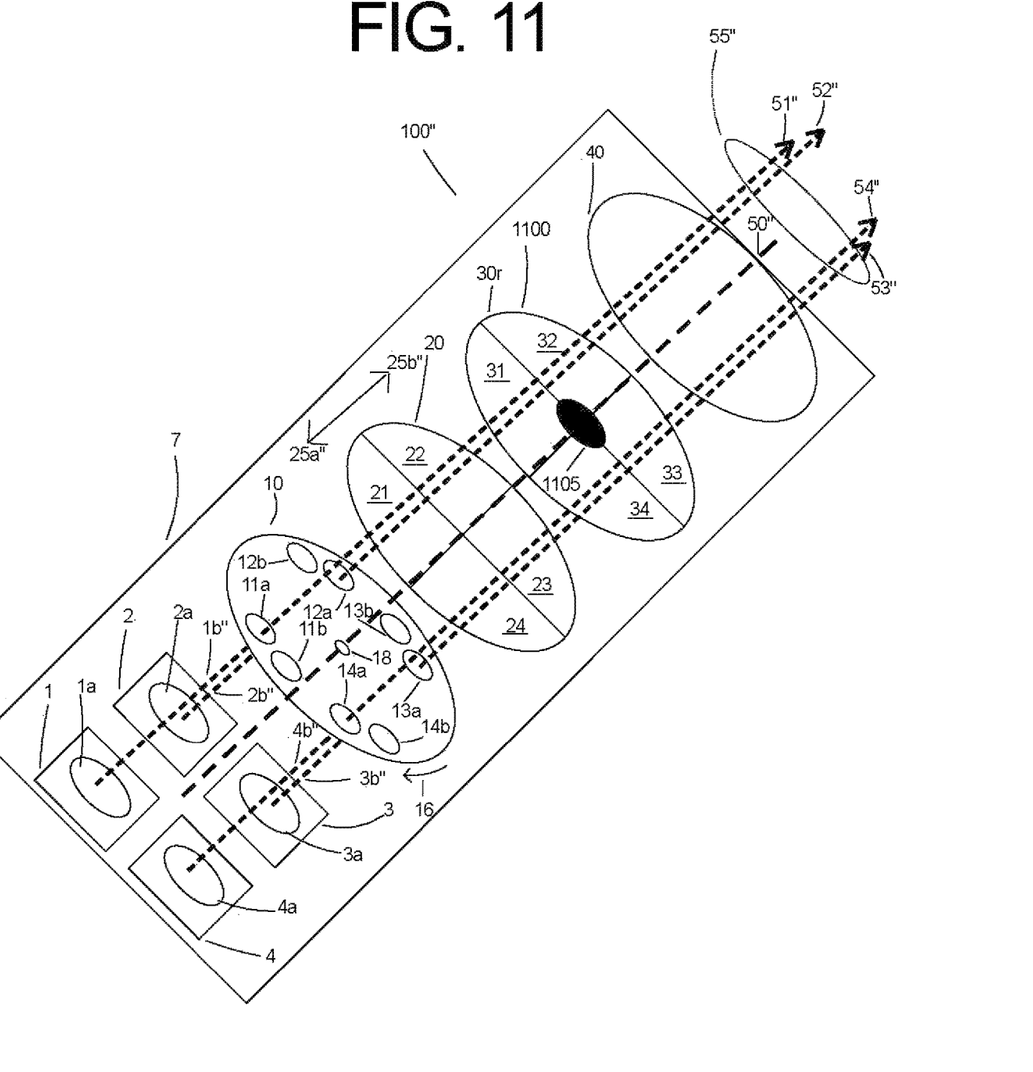
FIG. 11 shows a light projector in accordance with yet another embodiment of the present invention.

FIG. 11 shows a light projector 100" in accordance with another embodiment of the present invention. The light projector 100" is identical to the light projector 100 of FIG. 1, except as will be explained. The light projector 100" has a diffusion system or apparatus 1100 instead of the diffusion system or apparatus 30 shown in FIG. 1. FIG. 11 also shows light paths 1b", 2b", 3b", and 4b", and arrows 51", 52", 53", and 54", 25a" and 25b" which may differ somewhat from light paths 1b, 2b, 3b, 4b, and arrows 51, 52, 53, 54, and arrows 25a and 25b, respectively, due the presence of component 1100 as opposed to component 30 in FIG. 1, and generally due to the fact that light projector 100" is a different overall device from light projector 100.

Figure 12:
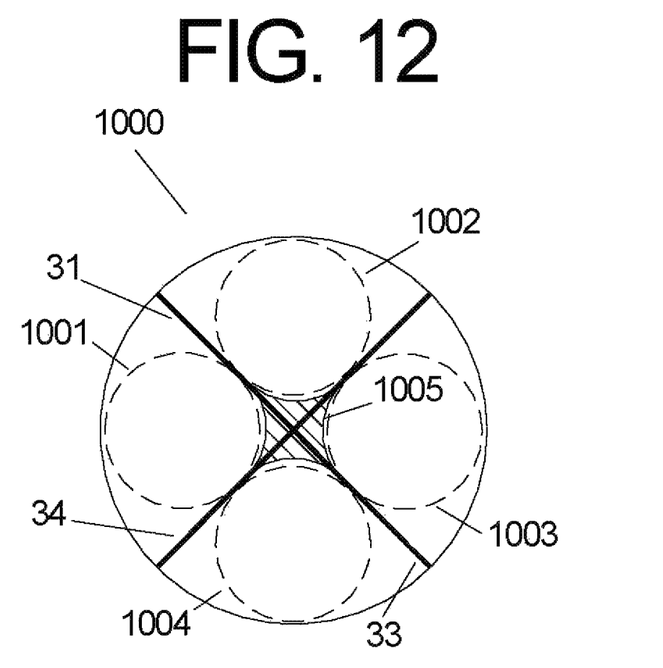
FIG. 12 shows a front view of a device, which can be used to form an output aperture of the light projector of FIG. 11.
Figure 13:
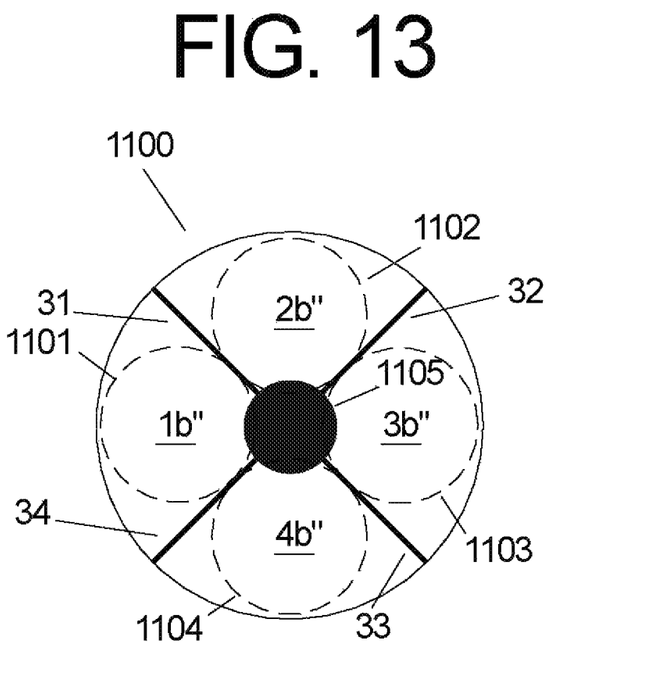
FIG. 13 shows a front view of the output aperture of the light projector of FIG. 11.

FIG. 12 shows a front view of a device 1000 for forming a diffusion system or apparatus 1100 of FIG. 13 for the light projector 100" of FIG. 11. Four dotted circles 1001, 1002, 1003 and 1004 are shown that represent the predicted illuminated area of the light paths 1b", 2b", 3b", and 4b", respectively, predicted to pass through device 1000 (without the mask 1105). A light void area 1005 centered on the center axis 50" of light projector 100" is shown where there light paths 1b", 2b", 3b" and 4b" are predicted not converged to illuminate the light void area 1005.

FIG. 13 shows a front view of the diffusion system or apparatus 1100 of the light projector 100"". Four dotted circles or regions 1101, 1102, 1103 and 1104 are shown that represent the illuminated area of the light paths of 1b", 2b", 3b", and 4b" respectively that pass through the diffusion system 1100. The light void area 1005 of FIG. 12 centered on the center axis 50" of light projector 100" has been masked in the non-converged area by the central integrating mask 1105.

Figure 14:
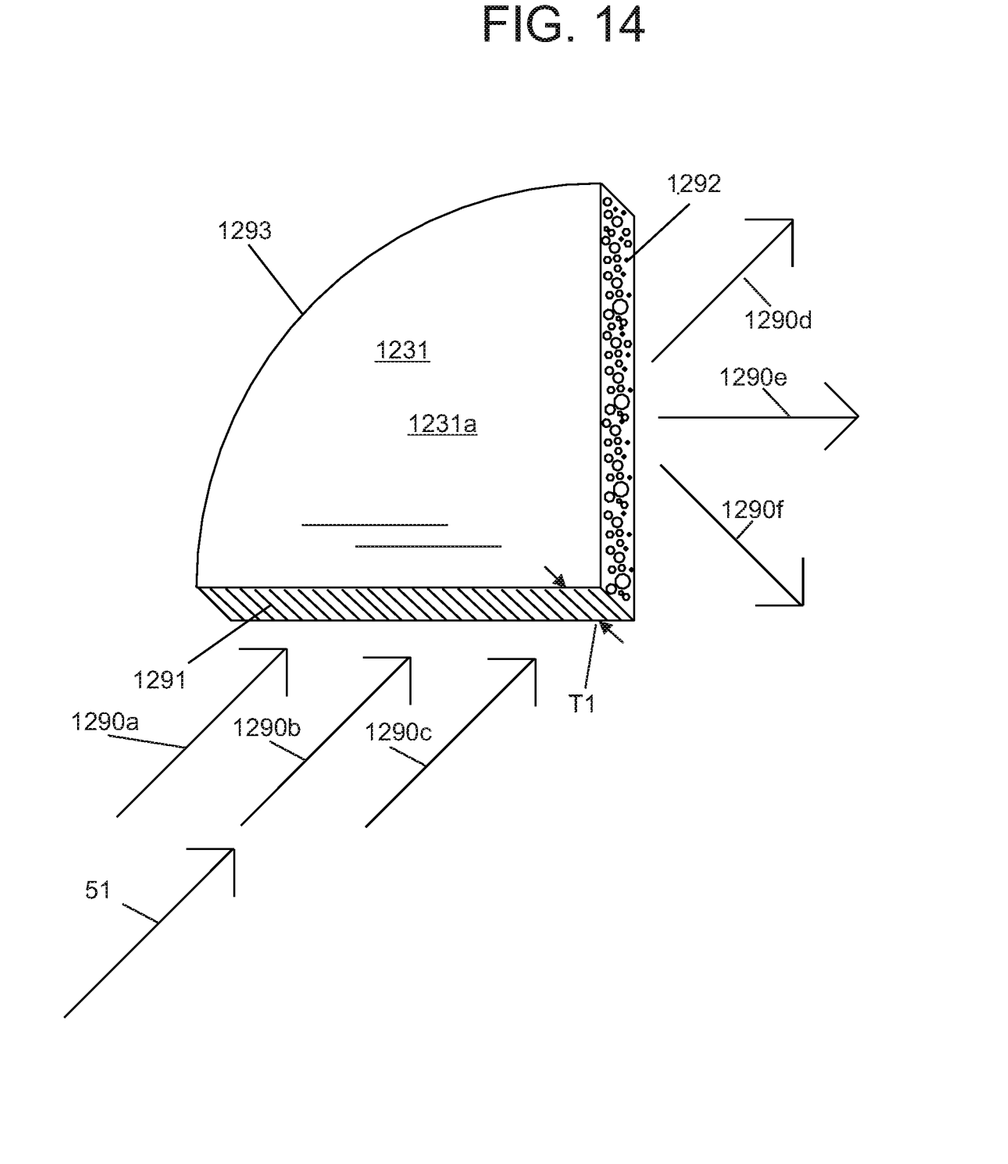
FIG. 14, shows a three dimensional perspective view of a diffusing sector of which may be part of a diffusion system that causes a theater light projector to obtain a pleasing ornamental effect in accordance with another embodiment of the present invention.

FIG. 14 shows an optically diffusing sector 1231 in a three-dimensional perspective view that shows the thickness of the sector 1231. The sector 1231 may be used in the light projector 100 of FIG. 1, in FIGS. 4, 5, in the light projector 100' in FIG. 8, in the light projector 100" in FIG. 11, and in FIGS. 12-13 in place of the sector 31. Each of the sectors 32-34 may also be replaced with a diffusing sector identical to sector 1231, so that in the orientation shown by FIG. 1, the diffusing sector 1231 and three identical diffusing sectors replacing sectors 32-34, combine to substantially form a circular shape similar or identical to the circular shape formed by sectors 31, 32, 33, and 34 in FIG. 1, wherein the surface and/or plane of the circular shape is perpendicular or substantially perpendicular to light paths 51, 52, 53, and 54.

The sector 1231 may be similar or identical to the sector 31 except for as described in the present application. The sector 1231 may include a surface or plane 1231a, which is bound by edge 1291, edge 1291, and arc edge 1293. The sector 1231 may also be called a diffuser substrate.

The sector 1231 may be inserted in the light projector 100 of FIG. 1, in place of the sector 31, in a similar or identical orientation of sector 31, so that the sector 1231 intersects light from the light path shown by arrow 51, and so that the plane or surface 1231a is perpendicular or substantially perpendicular to the light path 51, as for sector 31 in FIG. 1.

The sector 1231, along with identical or substantially identical sectors which replace sectors 32, 33, and 34 shown in FIG. 1, may be put into a state or stage, similar to or identical to state 30p shown in FIG. 5, in which the sector 1231, along with sectors analogous to sectors 32, 33, and 34, have been rotated, about their center axis ninety degrees, from a state identical or analogous to the state shown in FIG.

1, to a state where the planes of the diffusing sectors 1231 (surface or plane 1231*a*), and sectors replacing sectors 32, 33, and 34, are arranged parallel to the light paths 1*b*, 2*b*, 3*b*, and 4*b*, and 51, 52, 53, and 54.

The diffusing sector 1231 and identical or substantially identical diffusing sectors replacing sectors 32-34 can be rotated so that the plane 1231*a* and planes of identical or substantially sectors replacing sectors 32-34 are at various angles, between zero and ninety degrees with respect to the light paths 1*b*, 2*b*, 3*b*, and 4*b*, and 51, 52, 53, and 54, A diffusion system including sector 1231 instead of sector 31, and including identical or substantially identical sectors in place of sectors 32-34 but analogous to the diffusion system 30 of FIG. 5 in state 30*p*, allows the light paths 1*b*, 2*b*, 3*b*, and 4*b* to effectively pass through the diffusion system without substantially altering the light paths 1*b*, 2*b*, 3*b* or 4*b* with the diffusion optical property of the diffusing sectors 1231, and identical or substantially identical sectors in place of sectors 32, 33 and 34. The diffusing sectors 1231, and identical or substantially sectors in place of sectors 32, 33, and 34 can be rotated about their corresponding axes analogous to axes 31*c*, 32*c*, 33*c* and 34*c*, shown in FIG. 4, respectively, by any suitable electro mechanical or manual means as known in the art.

The sector 1231 shown in FIG. 14 has an edge 1291 which typically intersects the light path shown by arrow 51, when sector 1231 is inserted in the light projector 100 in place of sector 31, and when the sector 1231 is rotated so that the plane 1231*a* of the sector 1231 is parallel to the light path 51. The sector 1231 can also be rotated so that the plane 1231*a* of the sector 1231 is at an angle between zero and ninety degrees with respect to the light path shown by arrow 51.

In at least one embodiment, of the present application, the edge 1291 of the sector 1231 or diffuser substrate 1231 has been prepared substantially transparent by polishing or molding in a way that causes the edge 1291 to be substantially transparent with a smooth (non-rough) surface. The edge 1292 of the diffuser substrate or sector 1231 has been prepared by roughening, by sanding or texturing or alternatively, the edge 1292 may be made uneven. Light rays 1290*a*, 1290*b* and 1290*c* that are created by the light path shown by arrow 51, when the sector 1231 is substituted for sector 31 in FIG. 1, easily enter the polished surface edge 1291 of the diffuser sector 1231 because the edge 1291 is transparent. The light exiting edge 1292 of the diffuser substrate sector 1231 which has been prepared by roughening or texturing to cause the light rays to scatter and/or diffuse from the exiting edge 1292, as light rays 1290*d*, 1290*e* and 1290*f* of the diffuser substrate sector 1231 causing the edge 1292 to illuminate as "edge lit" as known in the art of edge lighting. The light rays 1290*a-c* enter at the substantially same angle, with respect to the edge 1291, and the light rays 1290*d-f* exit at different angles with respect to the edge 1292.

Generally, in at least one embodiment, the edge 1292, from which light rays 1290*d-f* exit, will be or will be made substantially rougher, substantially more uneven, and/or substantially less transparent than the edge 1291 from which light rays 1290*a-c* enter.

The edge 1293 is preferred to be substantially smooth or polished to prevent light that may leak from surface 1293 but it is not necessary to complete the desired edge lit effect.

The light rays 1290*a-c* cause the sector 1231 to illuminate the edge 1292 and cause an edge lighting effect found to be an ornamentally pleasing for the application of the theatre light projector. Generally, "Edge lighting" is defined by Webster's Dictionary as: "the ability of a transparent substance (such as plastic) to transmit light (as from the edge of a sheet or the end of a rod) so that it remains invisible until it emerges at the far edge or end regardless of bends or turns in the substance."

All four of the optical diffusing sectors or segments 31, 32, 33 and 34 can be replaced by a sector similar or identical to sector 1231. Sector 1231 is typically configured to edge illuminate when the sectors 1231, and identical or substantially identical sectors replacing sectors 32, 33, and 34, are in the non-light diffusing state as shown by FIG. 5.

The optical diffusing sectors or segments 1231, and identical or substantially identical sectors replacing sectors 32, 33 and 34 that illuminate their edges cause a pleasing and artistic effect in the non-diffusing of the sectors of segments that has adds an inherent value to the theatrical customer of the light projector 100, with sector 1231 replacing sector 31, and sectors similar or identical to sector 1231 replacing sectors 32-34, in the configuration of FIG. 1 or the light projector 100' of the configuration of FIG. 8.

It is preferred that the sectors or segments, such as sector 1231, and identical or substantially identical sectors replacing 32, 33, and 34, be comprised of a transmissive polymer having an edge thickness, T1, shown in FIG. 14, which is perpendicular to the surface or plane 1231*a*, for the edges 1291 and 1292, wherein T1 is greater than 1.5 mm (millimeters) so that the ornamentally pleasing edge lighting effect of the edge 1292 can easily be seen by a theatrical audience. A transmissive polymer resists cracking or breaking during load in and load out (handling) of the theatrical light projector by theatre technicians.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A theatre lighting apparatus comprising
a plurality of light sources;
wherein the plurality of light sources provide light of a plurality of wavelengths; and
further comprising a plurality of output lenses arranged on a same plane to project a plurality of light paths emitted by the plurality of light sources, one light path for each of the plurality of light sources;
a plurality of diffuser substrates;
wherein each the plurality of diffuser substrates is arranged to accept light from one of the plurality of light paths, so that there is one corresponding light path of the plurality of light paths for each of the plurality of diffuser substrates;
wherein each of the plurality of diffuser substrates is rotatable from a first state for each of the plurality of light paths to a second state for each of the plurality of light paths;
wherein each of the plurality of diffuser substrates is perpendicular to the corresponding light path of the plurality of light paths in the first state for each of the plurality of light paths;
wherein each of the plurality of diffuser substrates is parallel to the corresponding light path of the plurality of light paths in the second state for each of the plurality of light paths;

wherein a first diffuser substrate of the plurality of diffuser substrates in the first state for the first diffuser substrate accepts light from a first light path of the plurality of light paths;
wherein a second diffuser substrate of the plurality of diffuser substrates in the first state for the second diffuser substrate accepts light from the second light path of the plurality of light paths;
and wherein the first diffuser substrate of the plurality of diffuser substrates does not accept light from the second light path in the first state;
and wherein the second diffuser substrate of the plurality of diffuser substrates does not accept light from the first light path in the first state.

2. The theatre lighting apparatus of claim 1 wherein
the first diffuser substrate has a plane with two or more edges bordering the plane including an entrance edge and an exit edge; and
wherein the exit edge is prepared by one or more of sanding, texturing, or making the exit edge uneven so that light which enters the first diffuser substrate through the entrance edge and exits the first diffuser substrate through the exit edge is scattered.

3. The theatre lighting apparatus of claim 1 further comprising:
an exiting aperture wherein the exiting aperture is comprised of a polymer.

4. The theatre lighting apparatus of claim 3 wherein
the exiting aperture is comprised of a polycarbonate.

5. The theatre lighting apparatus of claim 3 wherein
the exiting aperture is coated with a stable wetting coating.

6. The theatre lighting apparatus of claim 5 wherein
the stable wetting coating is comprised of a siloxane.

7. The theatre lighting apparatus of claim 1 further comprising:
a first aperture device that includes a first color filter, wherein the first color filter is applied to modify a color of a colored light emitting diode of a first light source of the plurality of light sources.

8. The theatre lighting apparatus of claim 7 further comprising:
wherein the first aperture device that includes a second color filter and the second color filter is applied to modify a color of a colored light emitting diode of a second light source of the plurality of light sources.

9. A method comprising:
providing light from a plurality of light sources of a theatre lighting apparatus, wherein the plurality of light sources provide light of a plurality of wavelengths;
providing a plurality of output lenses on a same plane to project a plurality of light paths emitted by the plurality of light sources, one light path for each of the plurality of light sources;
providing a plurality of diffuser substrates, wherein each the plurality of diffuser substrates is arranged to accept light from one of the plurality of light paths, so that there is one corresponding light path of the plurality of light paths for each of the plurality of diffuser substrates;
wherein each of the plurality of diffuser substrates is rotatable from a first state for each of the plurality of light paths to a second state for each of the plurality of light paths;
wherein each of the plurality of diffuser substrates is perpendicular to the corresponding light path of the plurality of light paths in the first state for each of the plurality of light paths;
wherein each of the plurality of diffuser substrates is parallel to the corresponding light path of the plurality of light paths in the second state for each of the plurality of light paths;
wherein a first diffuser substrate of the plurality of diffuser substrates in the first state for the first diffuser substrate accepts light from a first light path of the plurality of light paths;
wherein a second diffuser substrate of the plurality of diffuser substrates in the first state for the second diffuser substrate accepts light from the second light path of the plurality of light paths;
and wherein the first diffuser substrate of the plurality of diffuser substrates does not accept light from the second light path in the first state;
and wherein the second diffuser substrate of the plurality of diffuser substrates does not accept light from the first light path in the first state.

10. The method of claim 9 wherein the first diffuser substrate has a plane with two or more edges bordering the plane including an entrance edge and an exit edge; and
wherein the exit edge is prepared by one or more of sanding, texturing, or making the exit edge uneven so that light which enters the first diffuser substrate through the entrance edge and exits the first diffuser substrate through the exit edge is scattered.

11. The method of claim 9 further comprising:
providing an exiting aperture, wherein the exiting aperture is comprised of a polymer.

12. The method of claim 11 wherein
the exiting aperture is comprised of a polycarbonate.

13. The method of claim 11 wherein
the exiting aperture is coated with a stable wetting coating.

14. The method of claim 13 wherein
the stable wetting coating is comprised of a siloxane.

15. The method of claim 9 further comprising:
modifying a color of a colored light emitting diode of a first light source of the plurality of light sources by use of a first color filter of a first aperture device.

16. The method of claim 15 wherein
modifying a color of a colored light emitting diode of a second light source of the plurality of light sources by use of a second color filter of the first aperture device.

* * * * *